April 18, 1950 — R. L. LINCOLN — 2,504,430
ELECTROSTATIC PRECIPITATOR
Filed Jan. 31, 1947 — 2 Sheets-Sheet 1

INVENTOR.
Roland L. Lincoln
BY Robert J. Palmer
Attorney

April 18, 1950     R. L. LINCOLN     2,504,430
ELECTROSTATIC PRECIPITATOR

Filed Jan. 31, 1947     2 Sheets-Sheet 2

INVENTOR.
Roland L. Lincoln
BY Robert T. Palmer
Attorney

Patented Apr. 18, 1950

2,504,430

UNITED STATES PATENT OFFICE 2,504,430

ELECTROSTATIC PRECIPITATOR

Roland L. Lincoln, Dover, Mass., assignor to Westinghouse Electric Corporation, East Pittsburgh, Pa., a corporation of Pennsylvania Application January 31, 1947, Serial No. 725,487

2 Claims. (Cl. 183—7)

1

This invention relates to electrostatic precipitators for the removal of foreign particles such as dust, from gases, such as air.

The most successful electrostatic precipitators for the removal of dust and other small foreign particles from gases, utilize ionizing chambers having oppositely charged, ionizer electrodes therein, followed by collection chambers having oppositely charged collector electrodes therein. In such a precipitator, it is usual to provide grounded, tubular, ionizer electrodes between which are supported ionizer wire electrodes to which a high voltage, which may be 12,000 volts, is applied, and to provide, grounded collector plates between which are placed charged collector plates to which a high voltage, which may be 6,000 volts, is applied. The ionizer wire electrodes are usually insulated from a grounded casing by 12,000 volt insulators, and the charged collector electrodes are usually insulated from the grounded casing by 6,000 volt insulators. The 12,000 volt insulators are not only much more expensive than the 6,000 volt insulators, but they are much larger and extend greater distances into the gas stream passing through the precipitator.

This invention eliminates the necessity for the higher voltage insulators usually provided for supporting the ionizer wire electrodes of an electrostatic precipitator from the casing thereof, by supporting the charged collector electrodes from the casing by relatively low voltage insulators, and by supporting the ionizer wire electrodes by relatively low voltage insulators from charged collector electrodes. Thus 6,000 volt insulators may be used to support charged collector electrodes from a casing, and 6,000 volt insulators may be used for supporting ionizer wire electrodes from charged collector electrodes.

Objects of the invention are to simplify the construction of, and to reduce the manufacturing cost of, electrostatic precipitators.

The invention will now be described with reference to the drawing, of which:

Figures 1, 2:
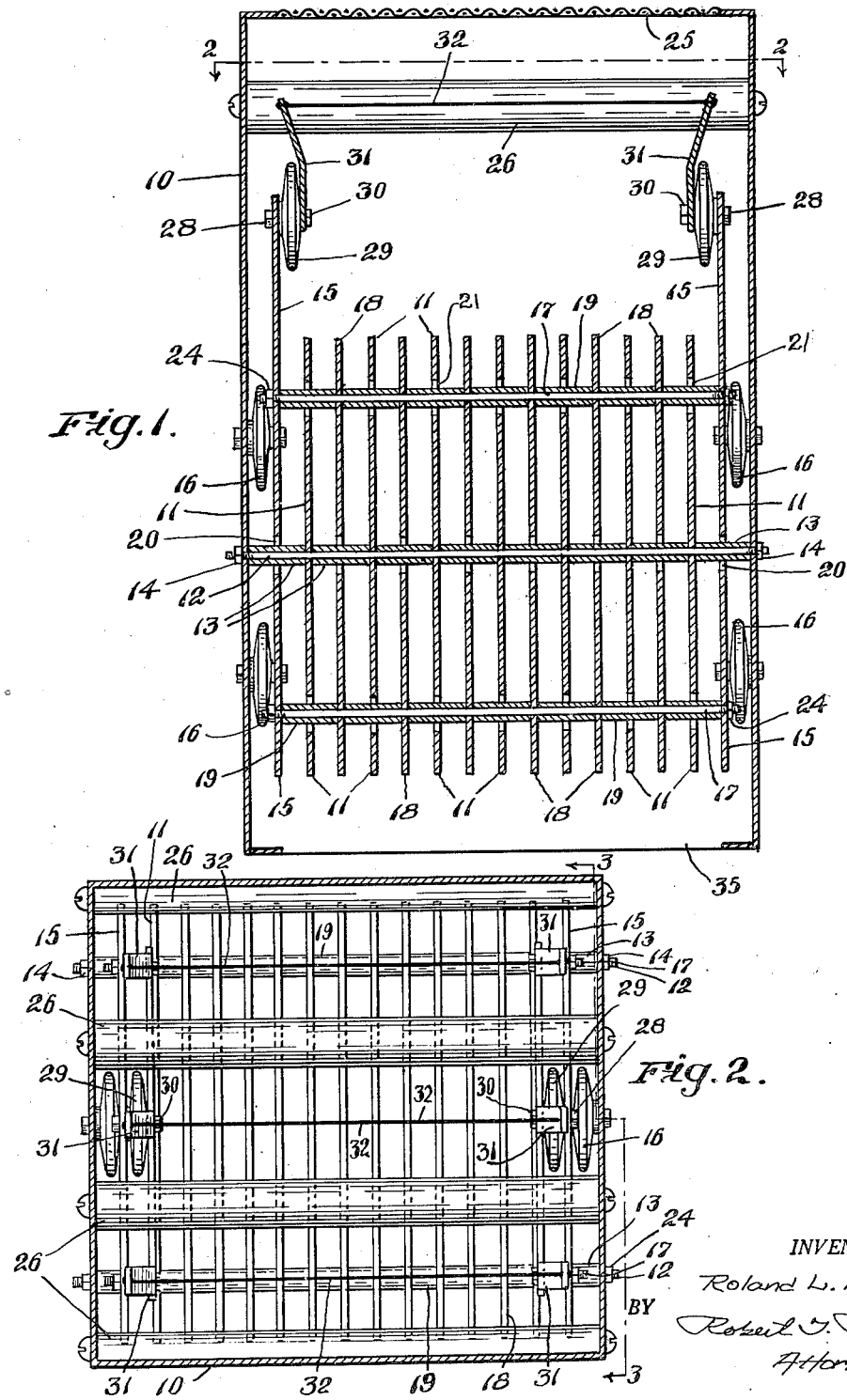
Fig. 1 is a side elevation, in section, of an electrostatic precipitator embodying this invention.
Fig. 2 is a sectional view along the lines 2—2 of Fig. 1.
Figure 3:
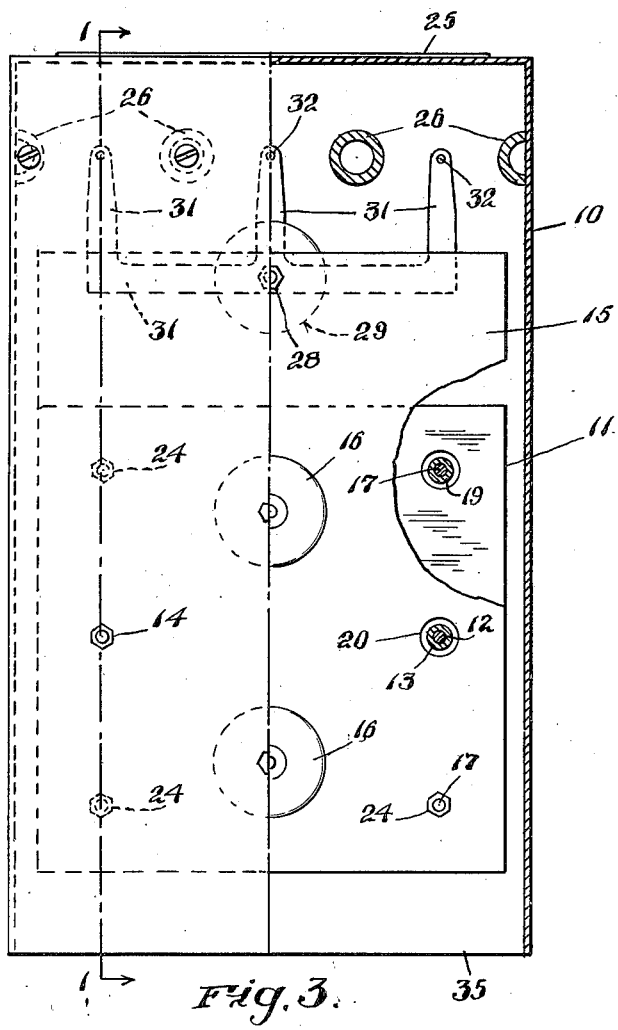
Fig. 3 is a sectional view along the lines 3—3 of Fig. 2.

The electrostatic precipitator illustrated has the sheet metal casing 10 which is adapted to be grounded as is usual in such devices. The grounded collector electrodes 11 formed in the illustrated embodiment of the invention, as metal plates, are supported from the casing 10 by the cylindrical, metal rods 12 which extend through apertures therein. The cylindrical, metal spacers 13 extend around the rods 12 between the adjacent electrodes 11 and between the outer electrodes 11 and the adjacent walls of the casing, and serve to space the electrodes 11 apart in parallel relationship, and to provide good electric contact between the electrodes 11 and the rods, the spacers fitting tightly around the rods, and contacting substantial surfaces of the electrodes 11. The ends of the rods 12 extend through the casing walls, and are threaded to receive the nuts 14, which when screwed up on the threaded ends of the rods, tighten the described electrode supports to the casing.

The two, outer charged electrodes 15, illustrated as metal plates, are supported from the casing 10 by the electric insulators 16 which have relatively large diameters, and relatively small thicknesses. The inner, charged electrodes 18, are supported from the outer, charged electrodes 15 by the cylindrical, metal rods 17 which extend through apertures therein parallel to the rods 12. The cylindrical, metal spacers 19 extend around the rods 17 between the adjacent electrodes 18 and between the outer electrodes 18 and the electrodes 15, and serve to space the charged electrodes apart in parallel relationship, and to provide good electric contact between same and the rods 17, the spacers 19 fitting tightly around the rods 17, and contacting substantial surfaces of the charged electrodes.

The outer ends of the rods 17 are threaded where they extend through the electrodes 15, for receiving the nuts 24 which secure the described charged electrode assembly in position, when screwed up on the threaded rod ends against the outer surfaces of the electrodes 15.

The rods 12 and the spacers 13 therearound pass through the clearance holes 20 in the charged electrodes 15 and 18, the clearance holes being sufficiently large that there is no electrical leakage between the charged electrodes and the spacers.

The rods 17 and the spacers 19 therearound pass through the clearance holes 21 in the grounded electrodes 11, the clearance holes being sufficiently large that there can be no electrical leakage between the grounded electrodes and the spacers 19.

The casing 10 has a gas inlet grille 25 in its upper portion, and extending between same and the described collector electrodes, are the tubular ionizer electrodes 26, which contact the end walls of the casing so as to be grounded thereto, and which extend with their axes parallel to the rods 12 and 17.

The upper ends of the charged electrodes 15 extend into the space between the tubular electrodes 26 and the upper ends of the electrodes 11 and 18, and have attached to their inner sides by the bolts 28, the insulators 29 which preferably are similar to the insulators 16 described in the foregoing. The inner sides of the insulators 29 have attached thereto by the bolts 30, the metal framework 31 to which are attached the ionizer wires 32 which are equally spaced between the tubular, ionizer electrodes 26, and which extend parallel thereto.

In the embodiment of the invention illustrated, the casing 10, the collector electrodes 11 and the tubular, ionizer electrodes 26 are grounded as described, and are adapted to be connected to the negative terminal of a suitable direct current power supply, the rods 12 and the spacers 13 therearound in contact with the electrodes 11 providing good electrical connections between the electrodes 11 and the casing. The charged electrodes 15 may be connected to the +6,000 volt terminal of the power supply. The ionizer wires 32 may be connected through the framework 31 to the +12,000 volt terminal of the power supply.

The ionizer wires 32 are seen to be insulated from the casing 10 by the insulators 16 and 29 instead of requiring as in the usual construction, a set of 6,000 volt insulators for insulating the charged collector electrodes from the casing, and a set of 12,000 volt insulators for insulating the ionizer wire electrodes from the casing, two sets of the lower voltage insulators may be used. The cost of the lower voltage insulators is less than that of the higher voltage ones, and they occupy less space, and provide less obstruction to gas flow.

The operation of the electrostatic precipitator is similar to that of the conventional ones which are well known to those skilled in the art, in that the gas entering the inlet 25 under the influence of an external fan, is ionized on passage between the ionizer wires 32 and the tubular, ionizer electrodes 26, whereby the dust and other foreign particles entrained in the gas, are given positive electrostatic charges which cause them to be attracted to the grounded electrodes 11, the clean gas passing out the outlet 35.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. An electrostatic precipitator comprising a casing, a pair of charged collector plates extending adjacent parallel opposite walls of said casing, insulators between the outer sides of said plates and said walls for supporting said plates therefrom, other charged collector plates supported from said plates, said pair of plates having corresponding ends extending beyond said other plates, ionizer wire electrodes in said casing, and means including insulators attached to the inner sides of said ends for supporting said wire electrodes therefrom.

2. An electrostatic precipitator comprising a casing, a pair of charged collector plates extending adjacent parallel opposite walls of said casing, insulators between the outer sides of said plates and said walls for supporting said plates therefrom, tubular ionizer electrodes attached to said walls, other charged collector plates supported from said pair of plates, said pair of plates having corresponding ends extending beyond said other plates towards said tubular electrodes but terminating short thereof, ionizer wire electrodes between said tubular electrodes, insulators attached to the inner sides of said ends, and wire electrode supporting means attached to said last mentioned insulators.

ROLAND L. LINCOLN.

REFERENCES CITED

The following references are of record in the file of this patent:

UNITED STATES PATENTS

| Number | Name | Date |
|---|---|---|
| 2,142,129 | Hoss et al. | Jan. 3, 1939 |
| 2,255,677 | Penney | Sept. 9, 1941 |